Aug. 8, 1950 G. W. LUHRMANN 2,517,903
MACHINE FOR PREPARING FIBROUS MATERIAL
FOR PNEUMATIC CONVEYANCE AND DISCHARGE
Filed March 5, 1948 2 Sheets-Sheet 1
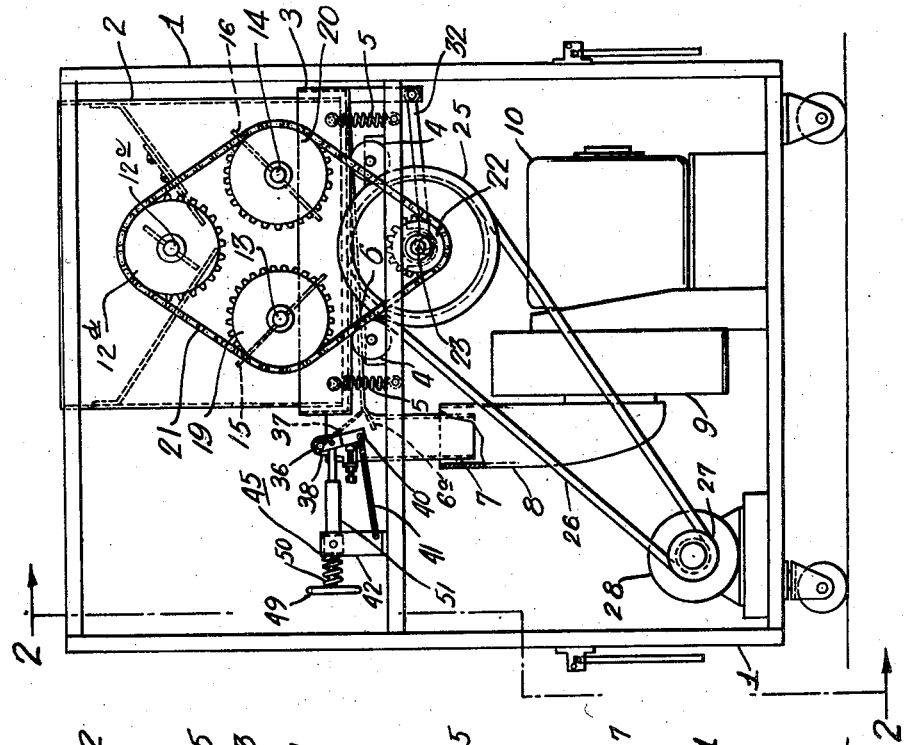
Inventor:—
George W. Luhrmann
by his Attorneys
Howson & Howson Aug. 8, 1950 G. W. LUHRMANN 2,517,903
MACHINE FOR PREPARING FIBROUS MATERIAL
FOR PNEUMATIC CONVEYANCE AND DISCHARGE
Filed March 5, 1948 2 Sheets-Sheet 2
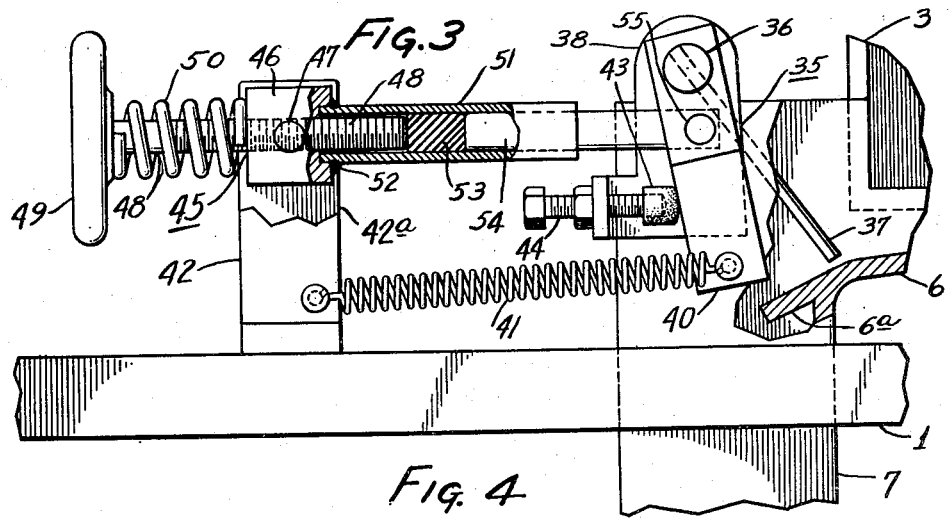
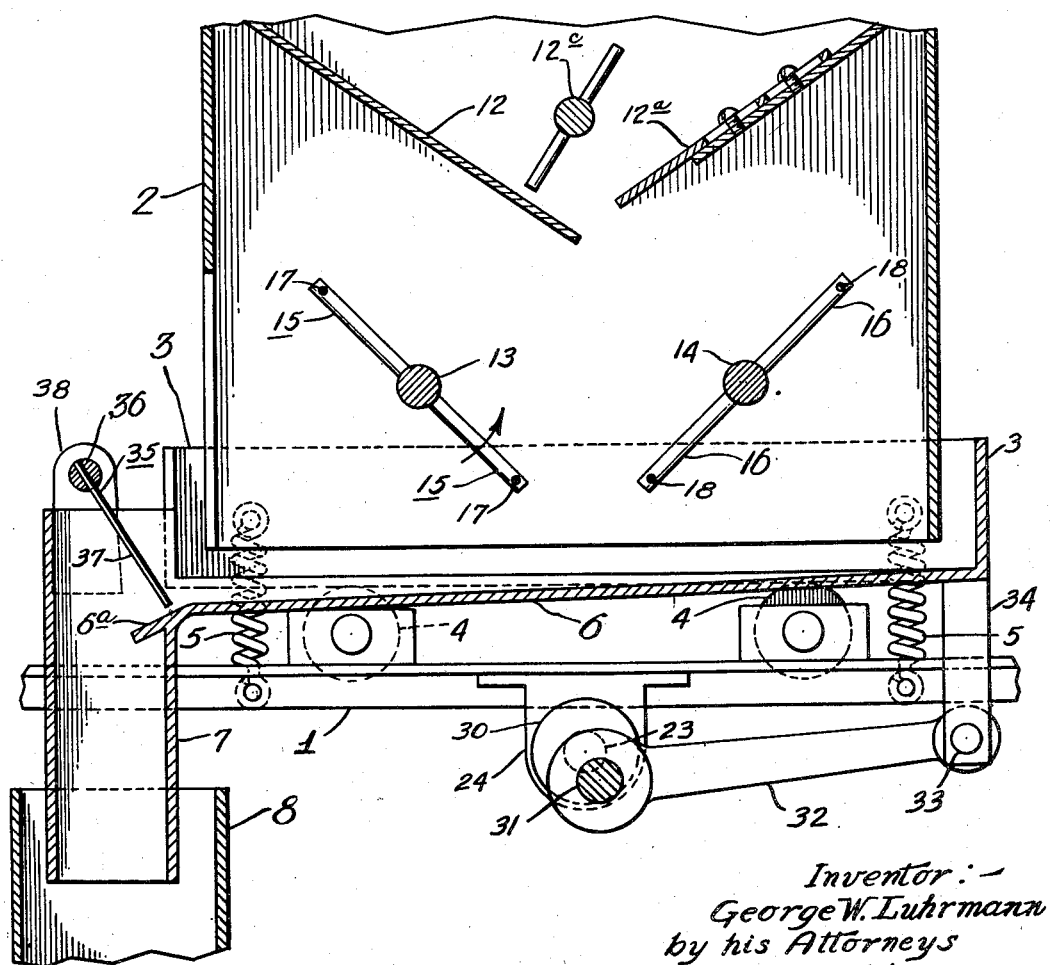
Inventor:—
George W. Luhrmann
by his Attorneys
Howson & Howson Patented Aug. 8, 1950

2,517,903

UNITED STATES PATENT OFFICE 2,517,903

MACHINE FOR PREPARING FIBROUS MATERIAL FOR PNEUMATIC CONVEYANCE AND DISCHARGE

George W. Luhrmann, Cedar Brook, N. J.

Application March 5, 1948, Serial No. 13,248

8 Claims. (Cl. 198—220)

This invention relates to new and useful improvements in apparatus for preparing fibrous material for discharge, together with a suitable binder, against a surface to which the material is to be adhesively attached for insulating or similar purposes. More particularly, the invention relates to certain improvements in fibre preparing machines of the type shown and described in my co-pending application Serial No. 569,515, filed December 23, 1944, now Patent Number 2,439,014 issued April 6, 1948.

In machines of the type set forth, the final separation of the fibrous material and the control of the rate of feed or delivery thereof from the hopper to the centrifugal blower is accomplished by a feed control member which is arranged in cooperative association with the discharge from the shaker pan beneath the feed hopper and mounted so that vibration of the shaker pan imparts an oscillatory movement to the member in the direction of feed of the fibrous material.

It has been determined that the results obtained in applying fibrous insulating material by these machines depend to a large extent upon the rate of feed of the material and that for a given batch of fibrous material, binder and operating conditions, the rate of feed of the material often will be more or less critical within relatively narrow limits.

With this in mind, one object of the present invention is to provide a machine of the character set forth embodying a novel construction and arrangement of parts for mounting and adjusting the position of the sweep of the feed control member relative to the shaker pan discharge and for controlling both the extent of sweep or oscillation of the member.

Another object of the present invention is to provide feed control means for machines of the type set forth having novel means for adjusting the location and extent or length of sweep of the control means relative to the shaker pan discharge within narrow limits.

A further object of the invention is to provide a novel construction and arrangement of parts for adjusting the location and extent of sweep of the feed control member in accordance with the foregoing, which is of relatively simplified and inexpensive construction, and entirely foolproof and effective in operation and use.

These and other objects of the invention and the various features and details of the construction and operation thereof are hereinafter fully set forth and described with references to the accompanying drawings, in which:

Fig. 1 is a side elevational view of one form of apparatus constructed in accordance with the present invention;

Fig. 2 is a view in section taken on line 2—2, Fig. 1;

Fig. 3 is an enlarged fragmentary view partially in section showing the construction and arrangement of the feed control rake and adjustments therefor; and Fig. 4 is an enlarged fragmentary sectional view showing the construction and arrangement of parts of the hopper and shaker box embodied in the illustrated form of the invention.

Referring now more particularly to the drawings, the illustrated embodiment of the present invention comprises a suitable framework 1 in the upper portion of which is fixedly mounted a feed hopper 2 for the finely divided particles of asbestos, fiberglass, or the like to be prepared for pneumatic conveyance and discharge as set forth.

The feed hopper 2 is open at the bottom and mounted directly below it is a vibrating feeder or shaker box 3. The vibrating shaker box 3 is supported upon spaced pairs of rollers 4 mounted on the framework 1 and the said shaker box 3 is retained in position upon the rollers 4 by suitable resilient means such as, for example, coil springs 5.

The shaker pan 3 is provided with an inclined bottom 6 which slopes longitudinally inward of the apparatus, for example as shown in Fig. 4 of the drawings, and converges transversely, terminating at its inner end in a declining lip 6a which projects inwardly of a vertically disposed discharge chute 7. The chute 7 in turn discharges into the inlet duct 8 of a centrifugal blower device 9 which may be rotationally driven by means of an electric motor or the like 10. The blower 9 has its discharge 11 extending laterally outward of the apparatus, for example in the relation shown in Fig. 2 of the drawings, and a flexible conduit or the like (not shown) usually is connected to the blower outlet so that the prepared fibrous material may be discharged against a surface which is located relatively remote from the apparatus.

Within the hopper 2 there is provided a pair of inwardly declining partitions or baffles 12 and 12a, respectively, the latter being adjustable relative to the former to vary the feed opening for the finely divided material, and above the feed opening defined by said baffles is an agitator device 12c for facilitating feeding of the material. Also mounted within the hopper 2 adjacent the lower end thereof is a pair of shafts 13 and 14, respectively, which are rotatably journaled in the side walls of the hopper 2. These shafts 13 and 14 carry oppositely extending radial arms 15 and 16, respectively, and the tips of the two arms lying at each side of the shafts are connected with a suitable wire rod or the like 17 and 18, respectively.

The assemblage comprising shaft 14, arms 16 and connecting rods 18 constitutes a beater and agitator in the lower portion of the hopper 2 which operates to beat and tear apart clods of the fibrous material in that region of the hopper, while the assemblage comprising the shaft 13, arms 15 and connecting rods 17 forms a similar beater and agitator in the hopper area adjacent the forward or inner wall of the said hopper.

The agitating and beating units are adapted to rotate in the same direction and operate to facilitate the breaking down of the clods of fibrous material more efficiently and more effectively before the fibres drop from the hopper in the shaker pan 3.

The beater shafts 13 and 14 and the agitator 12c are rotationally driven by means of sprockets or the like 19, 20 and 12d, respectively, secured exteriorly at one side of the hopper 2. The sprockets 19, 20 and 12d in turn are rotationally driven by means of a chain or the like 21 which is driven by a relatively smaller sprocket 22 fixed on the outboard end of a shaft 23 that extends horizontally of the apparatus and is rotationally journaled in suitable bearings 24 mounted upon a fixed member of the framework 1. The shaft 23 is rotationally driven at the desired speed through a relatively large pulley 25 which is fixed thereon and driven by a belt or the like 26 from a relatively smaller pulley 27 fixed on the shaft of a motor or like source of rotational power 28.

Vibration of the shaker box 3 is effected by means of a crank assembly comprising a disc 30 that is secured upon the shaft 23 for rotation therewith and carries an eccentric pin 31 on which is pivotally mounted one end of a connecting rod 32 that has its other end pivotally connected at 33 to a depending arm or the like 34 which is rigidly associated with the shaker pan 3.

For the purposes of controlling the rate of feed of fibrous material outwardly through lip 6a of the shaker 3 to the discharge chute 7 for delivery to the intake duct 8 of the blower 9, there is provided a feed control member 35 which is generally in the form of a rake and comprises a supporting bar 36 from which projects a plurality of relatively closely spaced parallel pin or wire elements 37. Mounting of the feed control member is accomplished by pivotally supporting the oppposite end portions of its bar 36 in suitable brackets 38 that are secured at opposite sides of the discharge chute 7 of the shaker pan 3 and arranged with reference to the length of the pins 37 so that the free ends of the latter are disposed to sweep the aforesaid discharge lip 6a of the shaker pan bottom 6 in closely spaced relation thereto.

Fixedly mounted upon one lateral end of the pivotally mounted bar 36 is one end of an arm 40 which has its other end resiliently connected by means of a tension spring 41 to a bracket 42 which is fixedly mounted with respect to the framework 1 of the apparatus. In the illustrated embodiment of the invention, the arm 40 is angularly disposed with reference to the pins 37, for example as shown in Fig. 3 of the drawings, for cooperative engagement with a stop 43 which is mounted on the shaker pan 3 and is adjustable with respect thereto through a suitable nut and bolt assembly 44 to vary the extent or length of sweep of the member 35.

Provision also is made for adjustment of the arm 40 relative to the adjustable stop 43 and consequently of the member 35 with respect to the shaker pan discharge lip 6a to predeterminedly position the oscillating member 35 longitudinally with respect to the discharge lip 6a. In the present instance this is accomplished by a manual control designated generally by reference numeral 45. As shown in the drawings, this manual control 45 comprises a block 46 having laterally projecting trunnions 47 which are pivotally mounted in the spaced upstanding arm portions 42a of the bracket 42, whereby the block 46 is mounted for pivotal or rocking movement in a vertical plane between the two bracket arms 42a. Threaded through the block 46 is an adjusting screw 48 having a handwheel 49 on one end and normally retained in the position to which adjusted by means of a coil spring 50 which surrounds the adjusting screw 48 in the relation shown in the drawings.

The other end of the adjusting screw 48 extends interiorly of a rigid tube or sleeve 51 that is secured to the block 46, for example, by welding as indicated at 52, and has its inner end face disposed in abutting relation against the adjacent end face of a resilient buffer 53 of rubber or like material, which is interposed between the screw 48 and a rod or like member 54 which has one end thereof slidably telescoped inwardly of the tube or sleeve 51 and has its other end pivotally connected as at 55 to the aforesaid arm 40 in the relation shown in Fig. 3. The telescopic relation of the sleeve 51 and rod 54 provides a lost motion connection permitting the member 35 to oscillate relative to the stationary adjusting screw 48.

Since the bracket 42 is fixedly secured upon the structural framework 1 of the apparatus and therefore stationary, it will be apparent that by selective correlated adjustment of the screw 48 and the stop 43, the extent and relative location with respect to the discharge lip 6a of oscillatory movement or sweep of the member 35 may be accurately controlled within very narrow limits over a substantial range from no movement at all of the member 35 to movement thereof through an arc of appreciable length. In this manner the rate of feed of fibrous material from the hopper 2 to the discharge chute 7 may be accurately controlled to a very fine degree.

From the foregoing description it will be apparent that the present invention provides a machine of the character embodying feed control means having a novel construction and arrangement of parts for mounting the same and adjusting the location and length of arcuate movement thereof relative to the vibrating feed member. The invention also provides feed control means for machines of the type set forth having novel means for adjusting the location and length of arcuate movement of the control means relative to the feed member with accuracy and within narrow limits. Furthermore, the invention provides novel feed control adjusting means which is of relatively simplified and inexpensive construction, and entirely foolproof and effective in operation and use.

While a particular embodiment of the invention has been illustrated and described herein, it is not intended to limit the invention to such disclosure, and changes and modifications may be made therein and thereto within the scope of the following claims without departing from the invention.

I claim:

1. In apparatus for preparing fibre stock comprising a vibrating feed member for the stock having a discharge portion, feed control means pivotally carried by the feed member and arranged for oscillatory movement in an arc substantially tangent to the discharge portion of said feed member, a stationary support adjacent the vibrating feed member, adjustable stop means carried by said vibrating feed member and arranged for engagement with said control means, and a connection between said stationary support and the feed control means adjustable in correlation with adjustment of said stop means to vary the location and length of arcuate movement of the control means with respect to the discharge portion of the vibrating feed member.

2. In apparatus for preparing fibre stock comprising a vibrating feed member for the stock having a discharge portion, feed control means pivotally carried by the feed member and arranged for oscillatory movement in an arc substantially tangent to the discharge portion of said feed member, a stationary support adjacent the vibrating feed member, adjustable stop means carried by said vibrating feed member and arranged for engagement with said control means, a connection between said stationary support and the feed control means adjustable in correlation with adjustment of said stop means to vary the location and length of arcuate movement of the control means with respect to the discharge portion of the vibrating feed member, and a spring interconnecting said control means and said stationary support normally biasing said control means in the direction of said stop means.

3. In apparatus for preparing fibre stock comprising a vibrating feed member for the stock having a discharge portion, feed control means pivotally carried by the feed member and arranged for oscillatory movement in an arc substantially tangent to the discharge portion of said feed member, a stationary support adjacent the vibrating feed member, adjustable stop means carried by said vibrating feed member and arranged for engagement with said control means, and adjustable means carried by said stationary support having a lost motion connected with said feed control means and adjustable in correlation with adjustment of said stop means to vary the location and length of arcuate movement of the control means with respect to the dircharge portion of the vibrating feed member.

4. In apparatus for preparing fibre stock comprising a vibrating feed member for the stock having a discharge portion, feed control means pivotally carried by the feed member and arranged for oscillatory movement in an arc substantially tangent to the discharge portion of said feed member, a stationary support adjacent the vibrating feed member, adjustable stop means carried by said vibrating feed member and arranged for engagement with said control means, adjustable means carried by said stationary support having a lost motion connected with said feed control means and adjustable in correlation with adjustment of said stop means to vary the location and length of arcuate movement of the control means with respect to the discharge portion of the vibrating feed member, and a spring interconnecting said feed control means and said stationary support and normally biasing said feed control means in the direction of said stop means.

5. In apparatus for preparing fibre stock comprising a vibrating feed member for the stock having a discharge portion, feed control means pivotally carried by the feed member and arranged for oscillatory movement in an arc substantially tangent to the discharge portion of said feed member, an arm carried by the control means, a stationary support adjacent the vibrating feed member, adjustable stop means carried by said vibrating feed member and arranged for engagement with the arm carried by said control means, and adjustable means carried by said stationary support having a lost motion connected with said arm and adjustable in correlation with adjustment of said stop means to vary the location and length of arcuate movement of the control means with respect to the discharge portion of the vibrating feed member.

6. In apparatus for preparing fibre stock comprising a vibrating feed member for the stock having a discharge portion, feed control means pivotally carried by the feed member and arranged for oscillatory movement in an arc substantially tangent to the discharge portion of said feed member, an arm carried by the control means, a stationary support adjacent the vibrating feed member, adjustable stop means carried by said vibrating feed member and arranged for engagement with the arm carried by said control means, adjustable means carried by said stationary support having a lost motion connection with said arm and adjustable in correlation with adjustment of said stop means to vary the location and length of arcuate movement of the control means with respect to the discharge portion of the vibrating feed member, and a spring interconnecting said arm and said stationary support normally biasing said arm in the direction of said stop means.

7. In apparatus for preparing fibre stock comprising a vibrating feed member for the stock having a discharge portion, feed control means pivotally carried by the feed member and arranged for oscillatory movement in an arc substantially tangent to the discharge portion of said feed member, a stationary support adjacent the vibrating feed member, adjustable stop means carried by said vibrating feed member and arranged for engagement with said control means, and means connecting said stationary support and feed control means including a threaded element and slidably telescoping members adjustable in correlation with adjustment of said stop means to vary the location and length of arcuate movement of the control means with respect to the discharge portion of the vibrating feed member.

8. In apparatus for preparing fibre stock comprising a vibrating feed member for the stock having a discharge portion, feed control means pivotally carried by the feed member and arranged for oscillatory movement in an arc substantially tangent to the discharge portion of said feed member, a stationary support adjacent the vibrating feed member, adjustable stop means carried by said vibrating feed member and arranged for engagement with said control means, means connecting said stationary support and feed control means including a threaded element and slidably telescoping members adjustable in correlation with adjustment of said stop means to vary the location and length of arcuate movement of the control means with respect to the discharge portion of the vibrating feed member, and spring means normally biasing said control means in the direction of said stop means.

GEORGE W. LUHRMANN.

REFERENCES CITED

The following references are of record in the file of this patent:

UNITED STATES PATENTS

| Number | Name | Date |
|--------|------|------|
| 474,777 | Keith | May 10, 1892 |
| 747,214 | Parker | Dec. 15, 1903 |